US012747854B2

(12) United States Patent
Koebl

(10) Patent No.: US 12,747,854 B2
(45) Date of Patent: Sep. 29, 2026

(54) WORK LIGHT

(71) Applicant: MILWAUKEE ELECTRIC TOOL CORPORATION, Brookfield, WI (US)

(72) Inventor: John F. Koebl, Menomonee Falls, WI (US)

(73) Assignee: MILWAUKEE ELECTRIC TOOL CORPORATION, Brookfield, WI (US)

(*) Notice: Subject to any disclaimer, the term of this patent is extended or adjusted under 35 U.S.C. 154(b) by 0 days.

(21) Appl. No.: 19/063,887

(22) Filed: Feb. 26, 2025

(65) Prior Publication Data

US 2025/0277578 A1 Sep. 4, 2025

Related U.S. Application Data

(60) Provisional application No. 63/560,929, filed on Mar. 4, 2024.

(51) Int. Cl.

| | |
|---|---|
| ***F21V 21/096*** | (2006.01) |
| ***F21L 4/02*** | (2006.01) |
| ***F21S 9/02*** | (2006.01) |
| ***F21V 21/14*** | (2006.01) |
| ***F21V 21/30*** | (2006.01) |
| *F21Y 115/10* | (2016.01) |

(52) U.S. Cl.

CPC ............ *F21V 21/0965* (2013.01); *F21L 4/02* (2013.01); *F21S 9/02* (2013.01); *F21V 21/145* (2013.01); *F21V 21/30* (2013.01); *F21Y 2115/10* (2016.08)

(58) Field of Classification Search

CPC .... F21V 21/0965; F21V 21/145; F21V 21/30; F21L 4/02; F21S 9/02

See application file for complete search history.

(56) References Cited

U.S. PATENT DOCUMENTS

| | | | | |
|---|---|---|---|---|
| 4,506,317 | A | 3/1985 | Duddy | |
| 7,434,954 | B1 | 10/2008 | Edgar | |
| 7,871,179 | B1 | 1/2011 | Edgar | |
| 9,534,748 | B2 | 1/2017 | Yu | |
| 10,036,518 | B2 | 7/2018 | Yu | |
| 11,255,525 | B2 | 2/2022 | Sergyeyenko et al. | |
| 11,448,372 | B2 | 9/2022 | Wenzel et al. | |
| 11,530,802 | B2 | 12/2022 | Sergyeyenko et al. | |
| 2005/0265033 | A1 | 12/2005 | Yang | |
| 2012/0033415 | A1* | 2/2012 | Sharrah | F21V 21/0965 362/199 |
| 2018/0340661 | A1* | 11/2018 | Inskeep | F21V 14/025 |
| 2021/0156528 | A1* | 5/2021 | Wenzel | F21L 4/04 |
| 2022/0090768 | A1* | 3/2022 | Westling | F21S 9/02 |
| 2022/0412516 | A1 | 12/2022 | Wenzel et al. | |
| 2023/0075761 | A1 | 3/2023 | Sergyeyenko et al. | |

(Continued)

FOREIGN PATENT DOCUMENTS

WO 2021050825 A1 3/2021

*Primary Examiner* — Christopher E Dunay

(74) *Attorney, Agent, or Firm* — Michael Best & Friedrich LLP

(57) ABSTRACT

A work light including a base, a light fixture, a magnet, and a boot. The light fixture is supported by the base. The magnet is coupled to the base. The magnet is configured to create a magnetic connection between the base and the work surface to selectively secure the base to the work surface. The boot is coupled to the base and is configured to reduce a strength of the magnetic connection between the base and the work surface.

15 Claims, 11 Drawing Sheets

(56) References Cited

U.S. PATENT DOCUMENTS

| | | | | |
|---|---|---|---|---|
| 2024/0410556 | A1 | 12/2024 | Koebl et al. | |
| 2025/0003559 | A1 * | 1/2025 | Kuta | F21V 21/22 |
| 2025/0067421 | A1 * | 2/2025 | Wells | F21V 21/0885 |

* cited by examiner

WORK LIGHT

CROSS-REFERENCE TO RELATED APPLICATIONS

This application claims priority to U.S. Provisional Application No. 63/560,929, filed Mar. 4, 2024, the entire contents of which are incorporated by reference herein.

FIELD OF THE INVENTION

The present disclosure relates to work lights, and more specifically, to work lights configured to be attached to a work surface through magnetism.

SUMMARY

In one aspect, the disclosure provides a work light including a base, a light fixture, a magnet, and a boot. The light fixture is supported by the base. The magnet is coupled to the base. The magnet is configured to create a magnetic connection between the base and a work surface to selectively secure the base to the work surface. The boot is coupled to the base and is configured to reduce a strength of the magnetic connection between the base and the work surface.

In some aspects, the boot inhibits the base from being magnetically secured to the work surface.

In some aspects, the base is securable to the work surface via the magnetic connection while the boot is attached to the base.

In some aspects, the magnet is exposed on a surface of the base, and the boot covers the magnet.

In some aspects, the boot is formed of a rubber material.

In some aspects, the base include an aperture, and the boot includes a protrusion that is configured to be inserted into the aperture to couple the boot to the base. In some aspects the aperture is one of a plurality of apertures in the base, the protrusion is one of a plurality of protrusions on the boot, and each protrusion of the plurality of protrusions is insertable into a corresponding aperture of the plurality of apertures to couple the boot to the base. In some aspects, the protrusion includes a plurality of sweeps, and the base compresses the plurality of sweeps when the protrusion is inserted into the aperture.

In some aspects, the boot includes a toe portion that is configured to wrap around an end of the base.

In some aspects, the boot includes a tab that is graspable to assist with removal of the boot from the base.

In some aspects, the boot includes a magnetic element configured to interact with the magnet to couple the boot to the base.

In some aspects, the boot includes a strap configured to couple the boot to the base.

In another aspect, the disclosure provides a work light including a base, a light fixture, a magnet, and a boot. The light fixture is supported by the base. The magnet is coupled to the base and is exposed on a surface of the base. The magnet is configured to create a magnetic connection between the base and a work surface to secure the base to the work surface. The boot is releasably attached to the base and covers the magnet.

In some aspects, the surface of the base includes an aperture, and the boot includes a protrusion that is configured to be inserted into the aperture to couple the boot to the base. In some aspects, the protrusion includes a plurality of sweeps, and the base compresses the plurality of sweeps when the protrusion is inserted into the aperture.

In some aspects, the boot includes a toe portion that is configured to wrap around an end of the base.

In another aspect, the disclosure provides a boot for use with a work light, the work light including a base, a light fixture supported by the base, and a magnet coupled to the base, the magnet configured to create a magnetic connection between the base and a work surface to selectively secure the base to the work surface. The boot includes a first end, a second end, and a wall. The first end is configured to align with a first end of the base. The second end is configured to align with a second end of the base. The wall extends between the first end and the second end. The wall is configured to reduce a strength of the magnetic connection between the base and the work surface.

In some aspects, the boot is formed of a rubber material.

In some aspects, the first end of the boot includes a toe portion that is configured to wrap around the first end of the base.

In some aspects, the second end of the boot includes a tab that is graspable to assist with removal of the boot from the base.

DETAILED DESCRIPTION

Before any embodiments of the disclosure are explained in detail, it is to be understood that the invention is not limited in its application to the details of construction and the arrangement of components set forth in the following description or illustrated in the following drawings. The disclosure is capable of other embodiments and of being practiced or of being carried out in various ways.

Figure 1A:
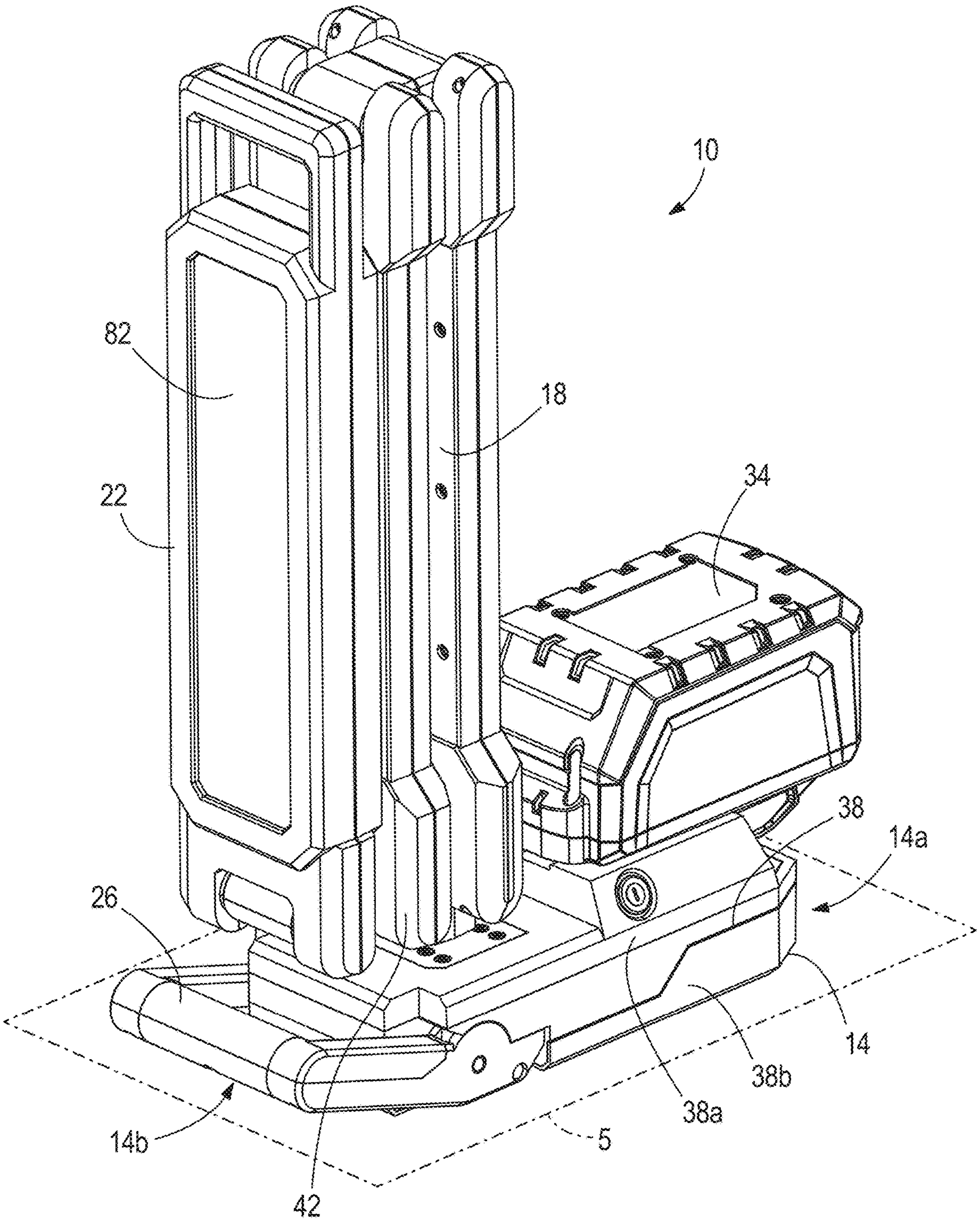
FIG. 1A is a perspective view of a work light in a first collapsed state and including a base, an arm, a light fixture, and a manual release assist mechanism according to an embodiment of the disclosure.
Figure 1B:
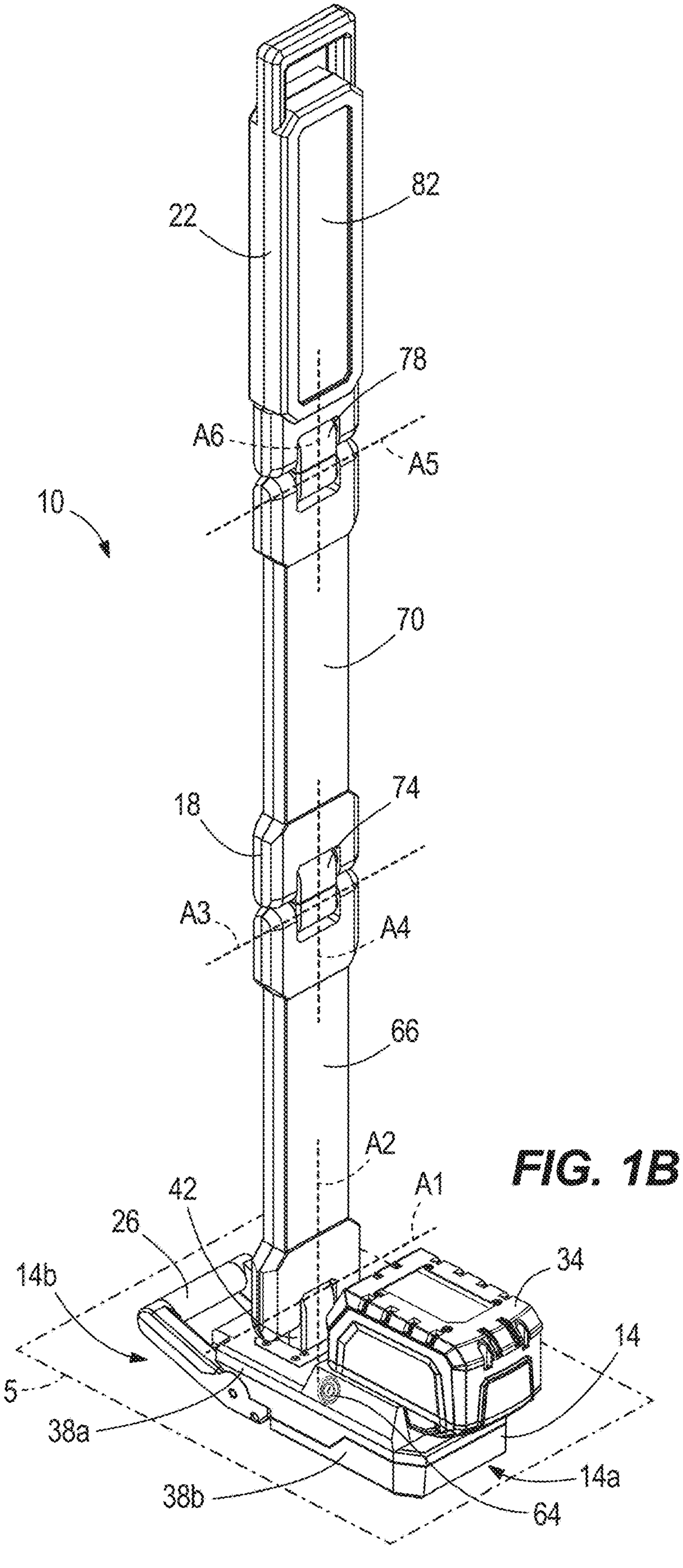
FIG. 1B is a perspective view of the work light in an extended state.

FIGS. 1A and 1B illustrate a work light 10. The work light 10 may also be referred to as a boom light. The boom light 10 is configured to be located on or adjacent to a work surface 5 to provide illumination for a work area. The boom light 10 is adjustable to provide illumination on the work area at different angles and from different heights. The illustrated boom light 10 is just one example of a work light. In other embodiments, the work light may have other configurations and components.

As illustrated in FIGS. 1A and 1B, the boom light 10 includes a base 14 having a first end 14*a* and a second end 14*b*, an articulating arm 18, a light fixture 22, a handle 26, and a boot 30 (FIG. 3) that may be releasably attached to the base 14. The base 14 is configured to be positioned on or attached to the work surface 5. In the illustrated embodiment, the base 14 is attachable to the work surface 5 through magnetism. In other embodiments, the base 14 may be attachable to the work surface 5 through other means, such as suction or adhesives. In still other embodiments, the base 14 may be attachable to the work surface 5 through a clamp, clips, or other types of fasteners. A battery 34 is removably attached to the base 14 at the first end 14*a* of the base 14 for providing power to the light fixture 22. The arm 18 is attached to the base 14 between the handle 26 and the battery 34. The arm 18 extends from the base 14 and is attached to the light fixture 22 at an end of the arm 18 opposite from the base 14. The arm 18 is adjustable between a collapsed state (FIG. 1A) and an extended state (FIG. 1B). The handle 26 is integrally formed with the base 14 at the second end 14*b* of the base 14. In some embodiments, the handle 26 may be separately formed from the base 14 and coupled to the base 14. The handle 26 is configured to assist removal of the base 14 from the work surface 5. The boot 30 may be attached to the base 14 (e.g., at a bottom of the base 14) to, for example, selectively cover the magnets or other attachment means on the base 14.

Figure 1C:
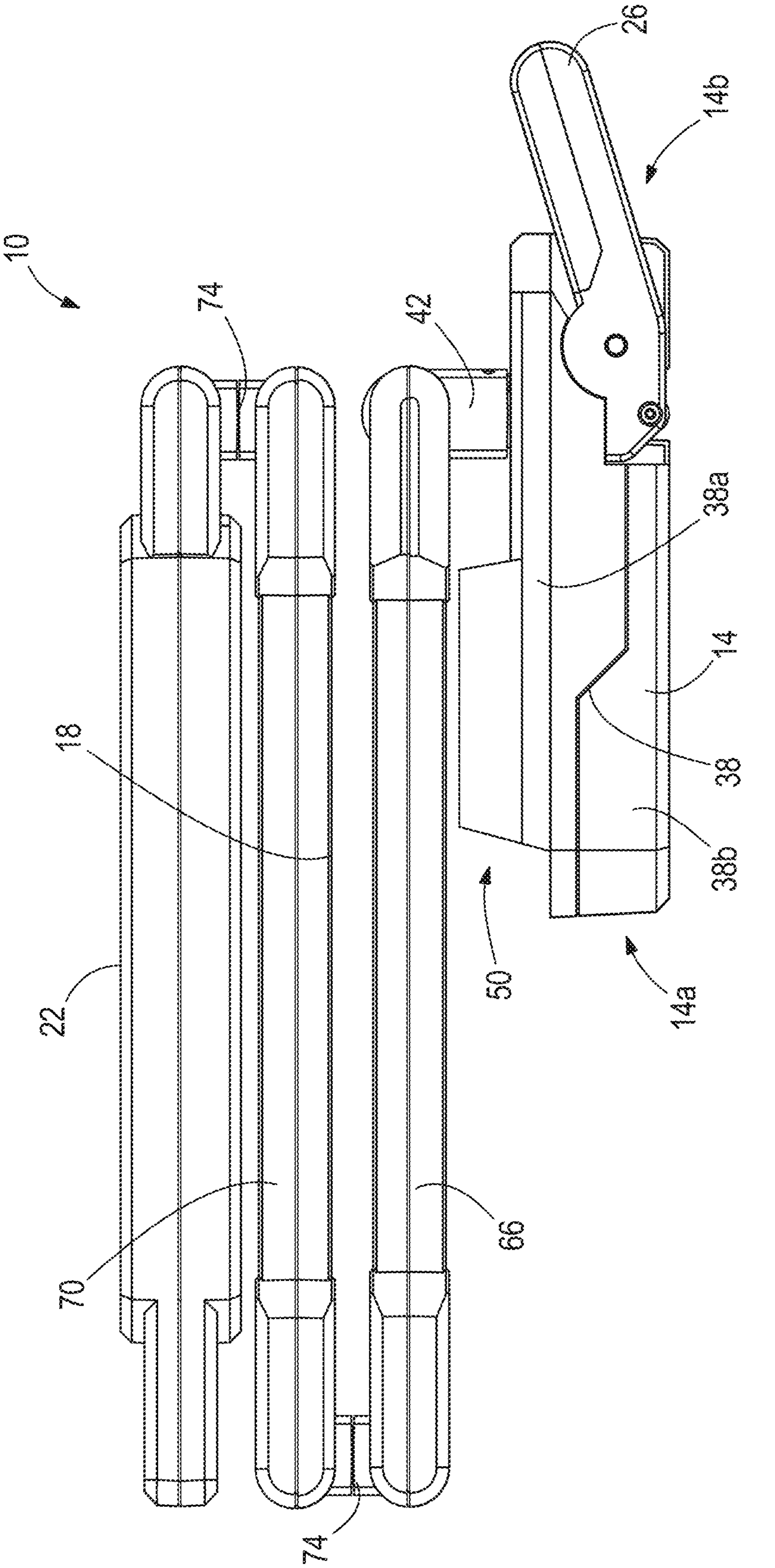
FIG. 1C is a plan view of the work light in a second collapsed state.
Figure 1D:
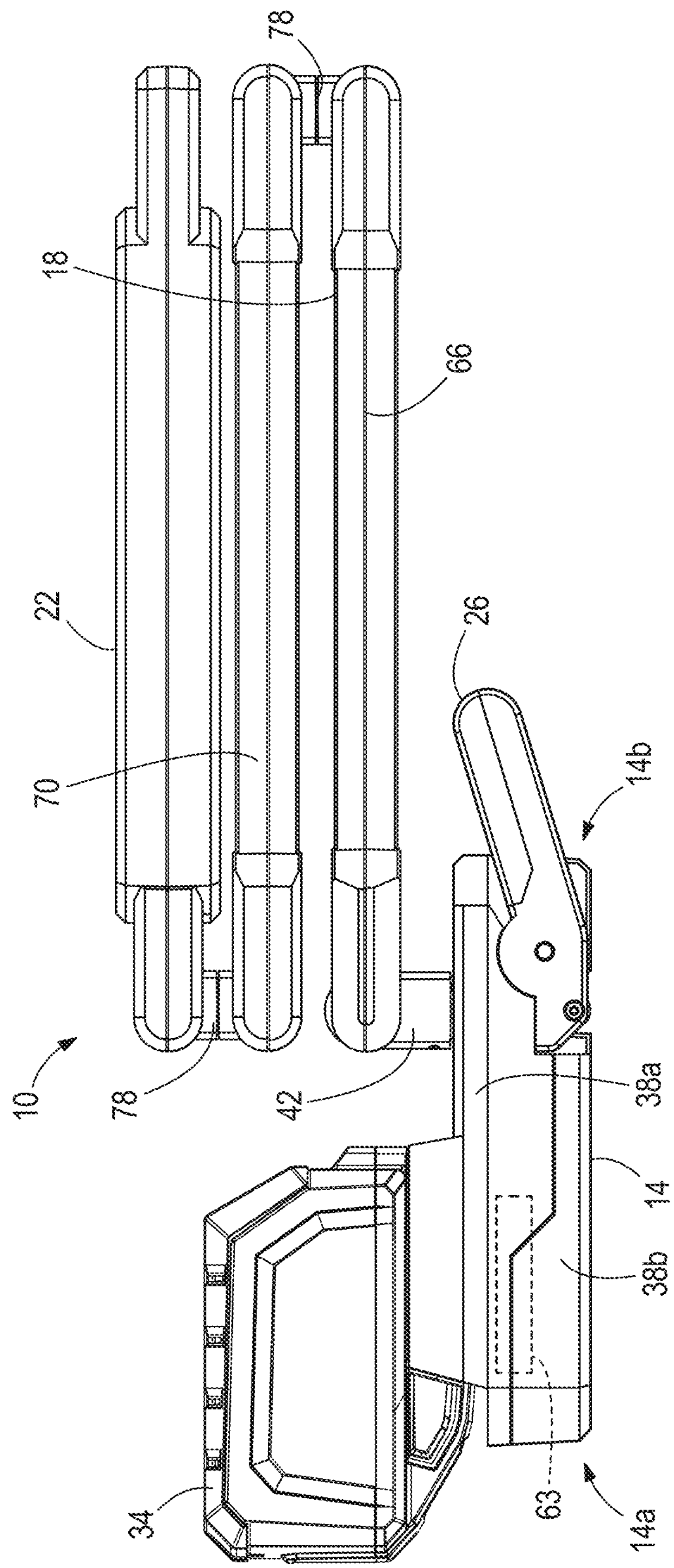
FIG. 1D is a plan view of the work light in a third collapsed state.

As illustrated in FIGS. 1A, 1C, and 1D, the arm 18 may be oriented in a first collapsed state (FIG. 1A), a second collapsed state (FIG. 1C), and a third collapsed state (FIG. 1D). With reference to FIG. 1A, the first collapsed state may also be referred to as an upright collapsed state in which the light fixture 22 extends substantially perpendicular to the base 14. With reference to FIG. 1C, the second collapsed state may also be referred to as a battery-side collapsed state in which the light fixture 22 extends parallel to the base 14 and toward a side of the base 14 (i.e., the first end 14*a* of the base 14) that receives the battery 34. The arm 18 may only be configurable in the second collapsed state when the battery 34 is not attached to the base 14. With reference to FIG. 1D, the third collapsed state may also be referred to as a handle-side collapsed state in which the light fixture 22 extends parallel to the base 14 and toward a side of the base 14 (i.e., the second end 14*b* of the base 14) that receives, or includes, the handle 26. As such, the arm 18 enables the boom light 10 to be adaptable to user-preference for, among other things, storing, packing, and transporting the boom light 10. As described in more detail below, the arm 18 is rotatable relative to the base 14 such that the arm 18 may be oriented in other collapsed states than illustrated in FIGS. 1A, 1C, and 1D.

Figure 2:
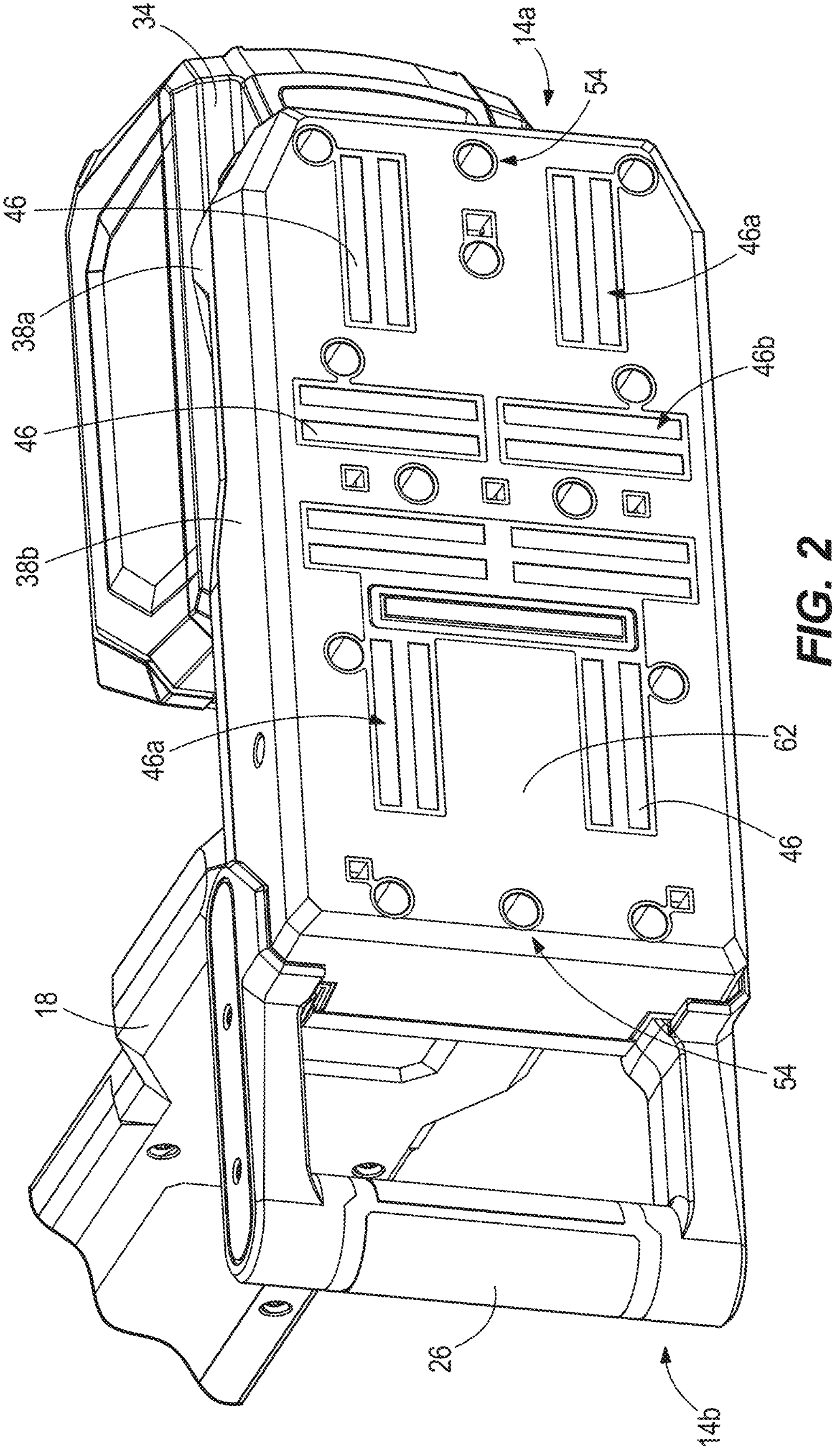
FIG. 2 is a bottom perspective view of the base of the work light.

With reference to FIGS. 1B and 2, the base 14 includes a housing 38, a base hinge 42, and a plurality of magnets 46 disposed within a cavity defined by the housing 38. The housing 38 includes a first portion 38*a* and a second portion 38*b*, and the cavity is defined between the first portion 38*a* and the second portion 38*b*. In the illustrated embodiment, the first portion 38*a* may also be referred to as an upper portion, and the second portion 38*b* may also be referred to as a lower portion. The first portion 38*a* of the housing 38 defines a battery receptacle 50 (FIG. 1C) that receives the battery 34. The second portion 38*b* of the housing 38 defines a plurality of apertures 54 that is configured to receive a plurality of fasteners 58 to couple the first portion 38*a* and the second portion 38*b* together. The base hinge 42 is positioned on the first portion 38*a* of the housing 38 and extends, or protrudes, from the first portion 38*a* of the housing 38. The base hinge 42 is coupled with the articulating arm 18 and enables the arm 18 to rotate relative to the base 14, as will be described in more detail. The plurality of magnets 46 extends from within the cavity through a bottom or magnetic surface 62 of the second portion 38*b* of the housing 38 such that at least a portion of each of the magnets 46 is exposed from the magnetic surface 62. As such, the plurality of magnets 46 creates a magnetic field for the magnetic surface 62, thereby enabling the magnetic surface 62 to secure the base 14 to the work surface 5 (FIG. 1A) via a magnetic connection with the work surface 5 (FIG. 1A). In the illustrated embodiment, the magnets 46 are permanent block magnets. In other embodiments, the magnets 46 may be formed in a different shape or be a different type of magnet. Additionally or alternatively, the magnets 46 may be positioned on the surface 62 of the base 14, rather than extending through the surface 62 from within the base 14

In the illustrated embodiment, the base 14 includes eight magnets 46. In other embodiments, the base 14 may include fewer magnets 46 or more magnets 46. For example, the base 14 may only include a single magnet. A first group of magnets 46*a* is oriented along (e.g., parallel to) a direction extending from the first end 14*a* of the base 14 to the second end 14*b* of the base 14. In the illustrated embodiment, the first group of magnets 46*a* includes four magnets 46. A second group of magnets 46*b* is oriented perpendicular to the first group of magnets 46*a*. In the illustrated embodiment, the second group of magnets 46*b* includes four magnets 46. All of the four magnets 46 from the second group of magnets 46*b* are positioned between sets of two magnets 46 from the first group of magnets 46*a*.

With reference to FIGS. 1A and 1D, when the battery 34 is received in the battery receptacle 50 (FIG. 1C), the battery 34 is configured to electrically connect to a printed circuit board assembly (i.e., a PCBA) 63 located in the base 14. The PCBA 63 is electrically connected to wiring that extends through the arm 18 to the light fixture 22 such that an electrical connection is formed between the light fixture 22 and the battery 34 through the PCBA 63. Returning reference to FIG. 3, an actuator or power switch 64 is supported by the housing 38 adjacent to the battery receptacle 50. The actuator 64 is electrically connected to the PCBA 63 and is actuatable to turn on and off a supply of electricity to the light fixture 22 (FIG. 1A) from the battery 34.

Figure 5:
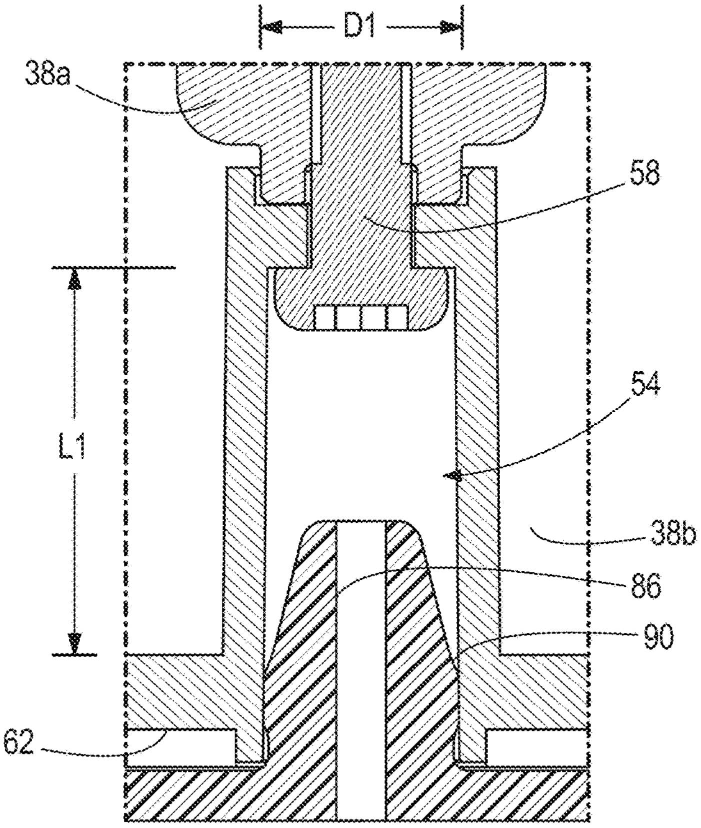
FIG. 5 is a cross-sectional view of a portion of the boot and a portion of the base when the base and the boot are attached.

As illustrated in FIGS. 2 and 5, each of the plurality of apertures 54, or screw bosses, in the base 14 is substantially circular. In other embodiments, the apertures 54 may have another shape. Each of the apertures 54 has a diameter D1 sized to receive a corresponding one of the fasteners 58 and a depth L1 extending from the magnetic surface 62 at least partially into the cavity. In the illustrated embodiment, the plurality of fasteners 58 are screws. Each of the screws 58 may be inserted into a corresponding one of the apertures 54 and tightened with a tool, such as a screwdriver, to secure the second portion 38*b* of the housing 38 to the first portion 38*a* of the housing 38, thereby forming the cavity. Specifically, the diameter D1 of the apertures 54 is large enough to receive the fasteners 58 and small enough to inhibit external forces and/or bodies from loosening the fasteners 58. The depth L1 of the apertures 54 allows the fasteners 58 to be recessed from the magnetic surface 62 to further inhibit external forces and/or bodies from loosening the fasteners

58. In other embodiments, the fasteners 58 may be another type of fastener 58 such as a fastener that may be toollessly tightened and loosened.

In the illustrated embodiment, the base 14, and more specifically the second portion 38*b* of the housing 38 of the base 14, defines thirteen apertures 54. In other embodiments, the base 14 may define fewer apertures 54 or more apertures 54. The thirteen apertures 54 at least includes three apertures 54 disposed along the first end 14*a* of the base 14, three apertures 54 disposed along the second end 14*b* of the base 14, and two apertures 54 disposed between two sets of magnets 46 from the second group of magnets 46*b*.

Returning reference to FIG. 1B, the arm 18 includes a first arm segment 66, a second arm segment 70, and an arm hinge 74 disposed between the two arm segments 66, 70 to enable rotation of the arm segments 66, 70 relative to each other. The first arm segment 66 is coupled to the base hinge 42 at one end of the first arm segment 60. The base hinge 42 allows the first arm segment 66 to rotate, or pivot, relative to the base 14 about two separate base hinge axes A1, A2. In the illustrated embodiment, the base hinge axes A1, A2 include a horizontal base hinge axis A1 that extends skew to the base 14 and a vertical base hinge axis A2 that extends through the base 14. The first arm segment 66 is connected to the arm hinge 74 at an end of the first arm segment 66 opposite from the base 14. The arm hinge 74 connects the first arm segment 66 to the second arm segment 70 and allows the arm segments 66, 70 to rotate, or pivot, relative to one another about two separate arm hinge axes A3, A4. In the illustrated embodiment, the arm hinge axes A3, A4 include a horizontal arm hinge axis A3 that extends parallel to the base hinge horizontal axis A1 when the arm 18 is in the extended state and a vertical arm hinge axis A4 that extends coaxial with the base hinge axis A2 when the arm 18 is in the extended state. Although only two arm segments 66, 70 and one arm hinge 74 are illustrated in FIG. 1B, the arm 18 may include additional arm segments 66, 70 and arm hinges 74 in some embodiments. In other embodiments, the arm 18 may include just one arm segment 66 and no arm hinges 74. In still other embodiments, the arm 18 may be omitted entirely. In further embodiments, the arm segments 66, 70 may be removably couplable to the arm hinges 74 such that the length of the arm 18 is adjustable by adding or removing arm segments 66, 70 from the arm 18.

Figure 3:
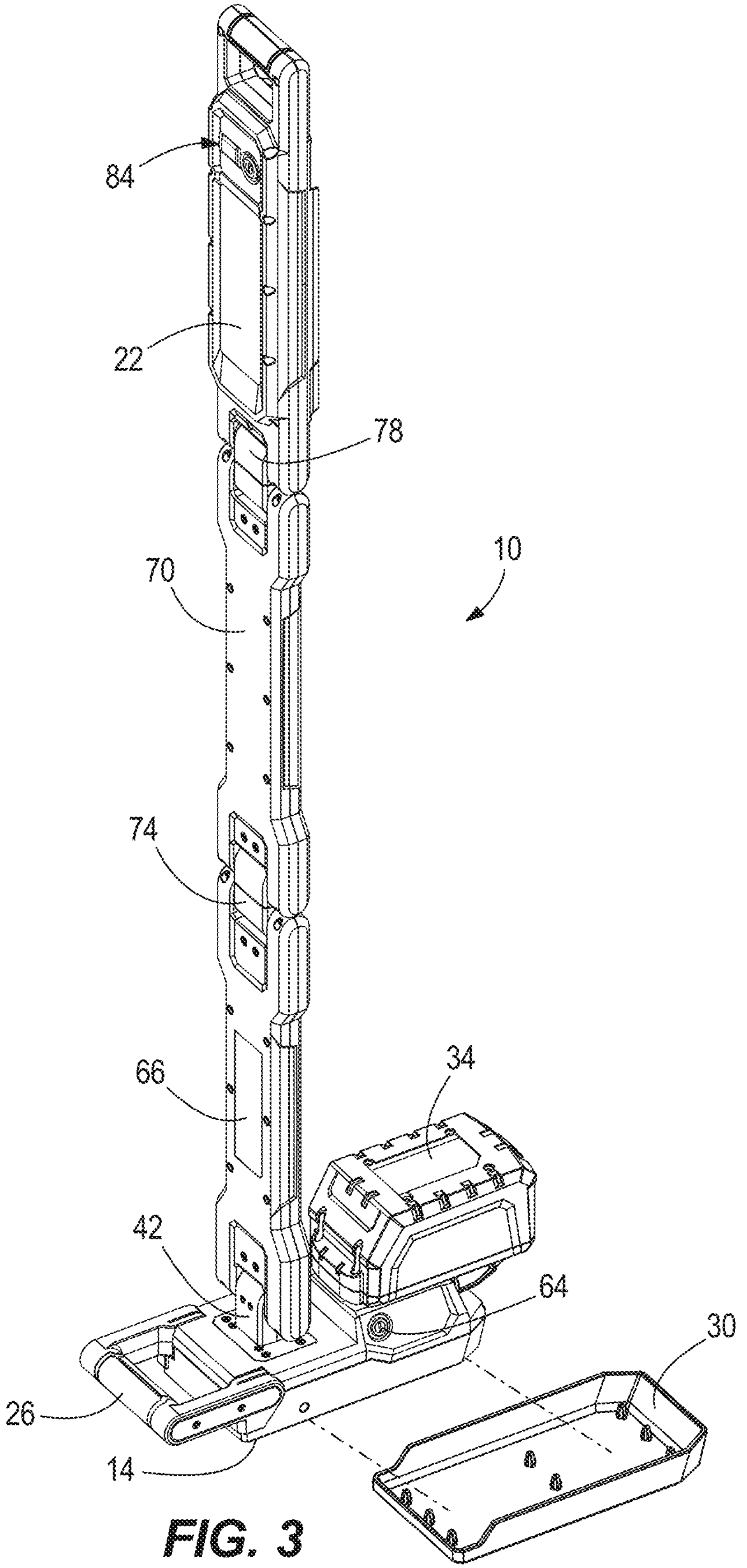
FIG. 3 is an exploded view of the work light, including a boot that is releasably attachable to the base.

With reference to FIGS. 1B and 3, the light fixture 22 is connected to the arm 18 at an end of the arm 18 opposite from the base 14. Specifically, the light fixture 22 is pivotably connected to the arm 18 via a light fixture hinge 78 that allows the light fixture 22 to pivot relative to the arm 18 about two separate light fixture axes A5, A6. In the illustrated embodiment, the light fixture axes A5, A6 include a horizontal light fixture axis A5 that extends parallel to the horizontal base hinge axis A1 when the arm 18 is in the extended state and a vertical light fixture axis A6 that extends coaxial with the vertical base hinge axis A2 when the arm 18 is in the extended state. The light fixture 22 is electrically coupled to the battery 34 via wiring that extends through the arm 18. As such, when the boom light 10 is turned on, the battery 34 supplies electricity to the light fixture 22 via the wiring such that the light fixture 22 is configured to emit light through a lens 82. Specifically, the light fixture 22 includes a plurality of light emitting diodes (LEDs) that are configured to illuminate when electricity is supplied to the light fixture 22 from the battery 34. In other embodiments, the light fixture 22 may include other light emitting means. The light fixture 22 further includes a user interface 84 that allows a user to turn the boom light 10 on and off and to adjust the intensity of light emitted through the lens 82 when the boom light 10 is on.

Figure 4:
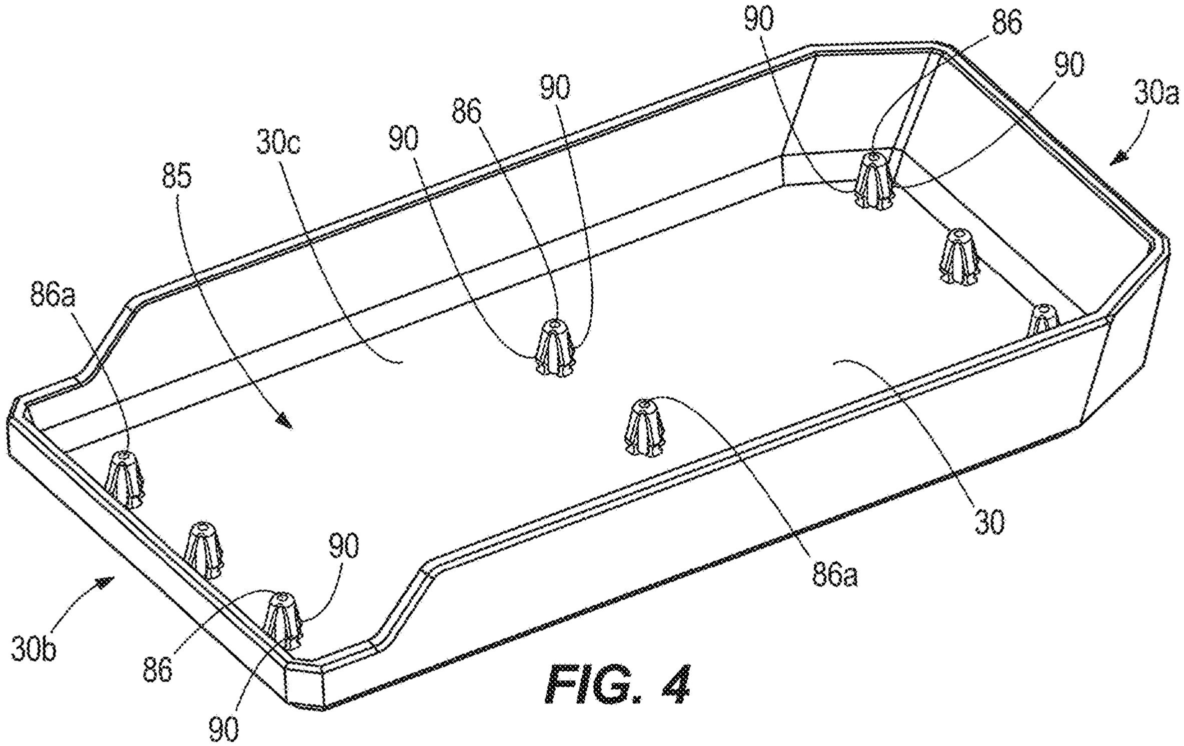
FIG. 4 is a perspective view of the boot of FIG. 3.

With reference to FIGS. 2-4, the boot 30 is shaped complementarily to the lower portion 38*b* of the housing 38 of the base 14 such that when the boot 30 is coupled to the base 14, the boot 30 substantially encapsulates the magnetic surface 62. As such, the boot 30 includes a first end 30*a* that is configured to align with the first end 14*a* of the base 14 and a second end 30*b* that is configured to align with the second end 14*b* of the base 14. The illustrated boot 30 also includes a wall 30*c* extending between the first end 30*a* and the second end 30*b*. The wall 30*c* may also be referred to as a bottom wall. The wall 30*c* is generally planar and shaped and sized to cover the magnetic surface 62 of the base 14. In the illustrated embodiment, the wall 30*c* covers the entire magnetic surface 62. In other embodiments, the wall 30*c* may cover only a portion of the magnetic surface 62. In the illustrated embodiment, the boot 30 is formed of a rubber material. The rubber material may be, for example, a natural rubber, a butyl rubber, a nitrile rubber, or another type of rubber. The rubber material of the boot 30 may inhibit wear caused by, among other things, engagement between the magnetic surface 62 and the work surface 5 (FIG. 1A), thereby increasing the lifespan of the base 14 of the boom light 10. The boot 30 may also help protect the work surface 5 from marring or scratches. Additionally, the boot 30 may adjust the strength of the magnetic connection between the magnetic surface 62 and the work surface 5 or other objects. Specifically, the material of the boot 30 provides a medium between the magnetic surface 62 and the work surface 5 (FIG. 1A) that increases the distance between the magnets 46 and the work surface 5 (FIG. 1A), thereby reducing the strength of the magnetic connection between the base 14 and the work surface 5 (FIG. 1A). However, the base 14 may still be securable to the work surface 5 (FIG. 1A) via magnetic connection with the boot 30 attached to the base 14. As such, the boot 30 may reduce the amount of force that is required to overcome the magnetic connection between the base 14 and the work surface 5 (FIG. 1A) to remove the base 14 from the work surface 5 (FIG. 1A). In other scenarios, such as when the boom light 10 is being stored in a toolbox or other container, the boot 30 may inhibit the magnets 46 from interacting with other objects in the toolbox or other container. In some embodiments, the boot 14 may be thin enough and/or made of a suitable material to not alter the magnetic connection between the base 14 and the work surface 5.

As illustrated in FIGS. 4 and 5, the boot 30 includes a coupling interface 85 that is configured to engage the magnetic surface 62 of the base 14 (FIG. 2) to releasably attach the boot 30 to the base 14. The coupling interface 85 has a plurality of protrusions 86 for coupling the boot 30 to the base 14. Each protrusion 86 has a cylindrical body 86*a* such that the protrusions 86 are shaped to be inserted into the circular apertures 54 of the second portion 38*b* of the housing 38 (FIG. 1A) to couple the boot 30 to the base 14. In the illustrated embodiment, the plurality of protrusions 86 includes eight protrusions 86. Specifically, the plurality of protrusions 86 includes three protrusions 86 disposed along the first end 30*a* of the boot 30 that are configured to be inserted into the three apertures 54 disposed along the first end 14*a* of the base 14, three protrusions 86 disposed along the second end 30*b* of the boot 30 that are configured to be inserted into the three apertures 54 disposed along the second end 14*b* of the base 14, and two protrusions 86 disposed roughly in the middle of the boot 30 (e.g., between the first end 30*a* and the second end 30*b*) that are configured to be inserted into the apertures 54 disposed between the two sets of magnets 46 from the second group of magnets 46. Each of the protrusions 86 includes a plurality of sweeps 90 equally spaced from each other around the cylindrical body 86*a* and extending outward from the cylindrical body 86*a* of the protrusion 86. In the illustrated embodiment, the sweeps 90 are compressible. When the protrusions 86 are inserted into the apertures 54 to couple the boot 30 to the base 14, the base 14 compresses the sweeps 90. The compression of the sweeps 90 creates a friction fit between the protrusions 86 of the boot 30 and the second portion 38*b* of the housing 38 (FIG. 1A) of the base 14. As such, the friction fit between the protrusions 86 of the boot 30 and the base 14 inhibits the boot 30 from falling off of the base 14. Specifically, the friction fit inhibits the boot 30 from being removed from the base 14 unless a force is applied to either the base 14 or the boot 30 that overcomes the friction fit.

Figure 6:
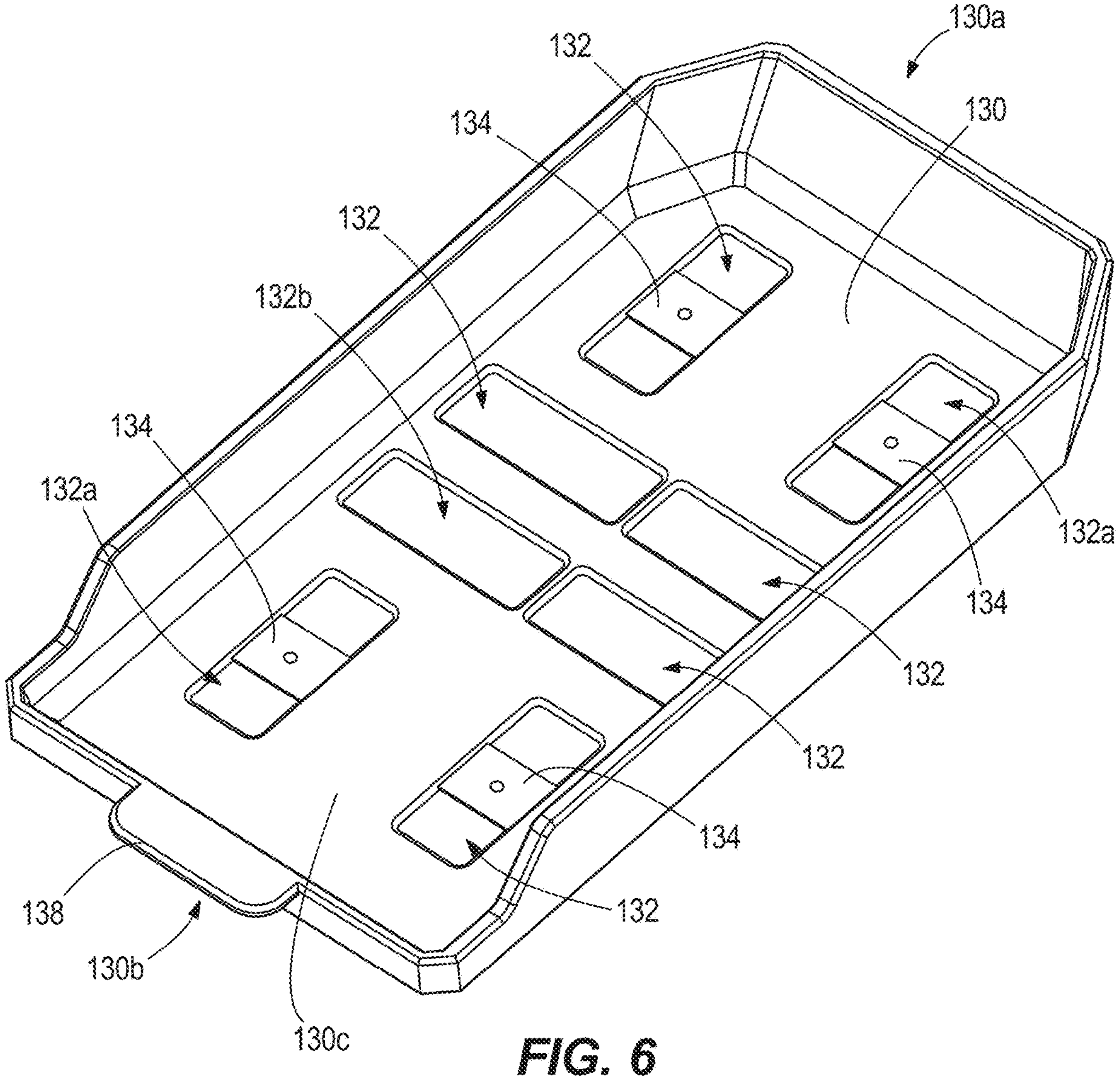
FIG. 6 is a perspective of a boot according to another embodiment of the disclosure.

FIG. 6 illustrates another embodiment of a boot 130 for the boom light 10 of FIG. 1A. With reference to FIGS. 1A and 6, the boot 130 is shaped complementarily to the second portion 38*b* of the housing 38 of the base 14 such that when the boot 130 is coupled to the base 14, the boot 130 substantially encapsulates the magnetic surface 62 (FIG. 2). As such, the boot 130 includes a first end 130*a* that is configured to align with the first end 14*a* of the boot 14 and a second end 130*b* that is configured to align with the second end 14*b* of the boot 14. The illustrated boot 130 also includes a wall 130*c* extending between the first end 130*a* and the second end 130*b*. The wall 130*c* may also be referred to as a bottom wall. The wall 130*c* is generally planar and shaped and sized to cover the magnetic surface 62 of the base 14. In the illustrated embodiment, the wall 130*c* covers the entire magnetic surface 62. In other embodiments, the wall 130*c* may cover only a portion of the magnetic surface 62. The boot 130 is formed of a hard plastic material and may be formed through an overmolding process. The hard plastic material may be, for example, high density polyethylene (HDPE), a polyether ether ketone (PEEK), or another similar material. The boot 130 may be inhibit wear caused by, among other things, engagement between the magnetic surface 62 (FIG. 2) and the work surface 5, thereby increasing the lifespan of the boom light 10. The boot 130 may also help protect the work surface 5 from marring or scratches. Additionally, the boot 130 is relatively thicker than the boot 30 of FIG. 4. As such, the boot 130 has a thickness that increases the distance between the magnets 46 (FIG. 2) and the work surface 5 to a distance in which the strength of the magnetic connection between the magnetic surface 62 (FIG. 2) and the work surface 5 is reduced and the base 14 of the boom light 10 does not magnetically attach to the work surface 5.

The boot 130 includes a plurality of receptacle slots 132 and a plurality of metal strips 134 positioned in the plurality of receptacle slots 132 for coupling the boot 130 to the base 14. In some embodiments, the metal strips 134 may be insert molded in the receptacle slots 132. In the illustrated embodiment, the boot 130 includes eight receptacle slots 132 and four metal strips 134. Each of the receptacle slots 132 is formed to align with a corresponding one of the magnets 46 in the base 14 (FIG. 2). As such, the eight receptacle slots 132 include a first group of receptacle slots 132*a* that extends along (e.g., parallel to) a direction extending from the first end 130*a* of the boot 130 to the second end 130*b* of the boot 130 and a second group of receptacle slots 132*b* that extends perpendicular to the first group of receptacle slots 132*a*. In the illustrated embodiment, each of the four metal strips 134 is supported in a corresponding one of the receptacle slots 132 from the first group of receptacle slots 132*a*. In some embodiments, each of the four metal strips 134 may be supported in a corresponding one of the receptacle slots 132 from the second group of receptacle slots 132*b*. In other embodiments, the four metal strips 134 may be supported in any combination of receptacle slots 132 from the first group of receptacle slots 132*a* and the second group of receptacle slots 132*b*. In further embodiments, the boot 130 may include eight metal strips 134 such that a metal strip 134 is supported in each of the receptacle slots 132. The plurality of magnets 46 interact with the metal strips 134, thereby enabling the boot 130 to secure to the base 14 via a magnetic connection between the magnets 46 and the metal strips 134. As such, the magnetic connection between the magnets 46 and the metal strips 134 inhibits the boot 130 from being removed from the base 14 unless a force is applied to either the base 14 or the boot 130 that overcomes the magnetic connection. The magnetic connection between the magnets 46 and the metal strips 134 may additionally reduce the magnetic connection between the base 14 (FIG. 2) and the work surface 5 (FIG. 1A) such that the boot 130 inhibits the base 14 from being magnetically secured to the work surface 5. In some embodiments, the metal strips 134 may be replaced with magnets that interact with the magnets 46 on the base 14. In still other embodiments, the boot 130 may include other types of magnetic elements that interact with the magnets 46 on the base 14. The boot 130 further includes a tab 138 that protrudes from the second end 130*b* of the boot 130 and that is graspable to assist a user with pulling the boot 130 off of the base 14.

Figure 7:
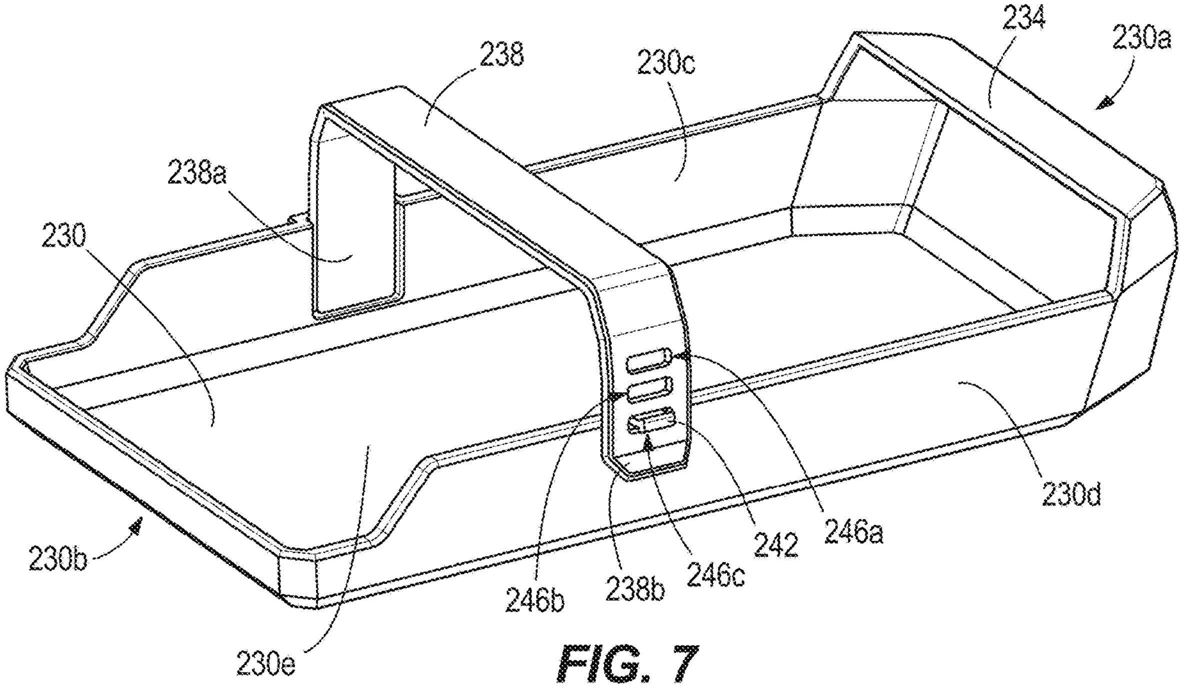
FIG. 7 is a perspective view of a boot according to another embodiment of the disclosure.
Figure 8:
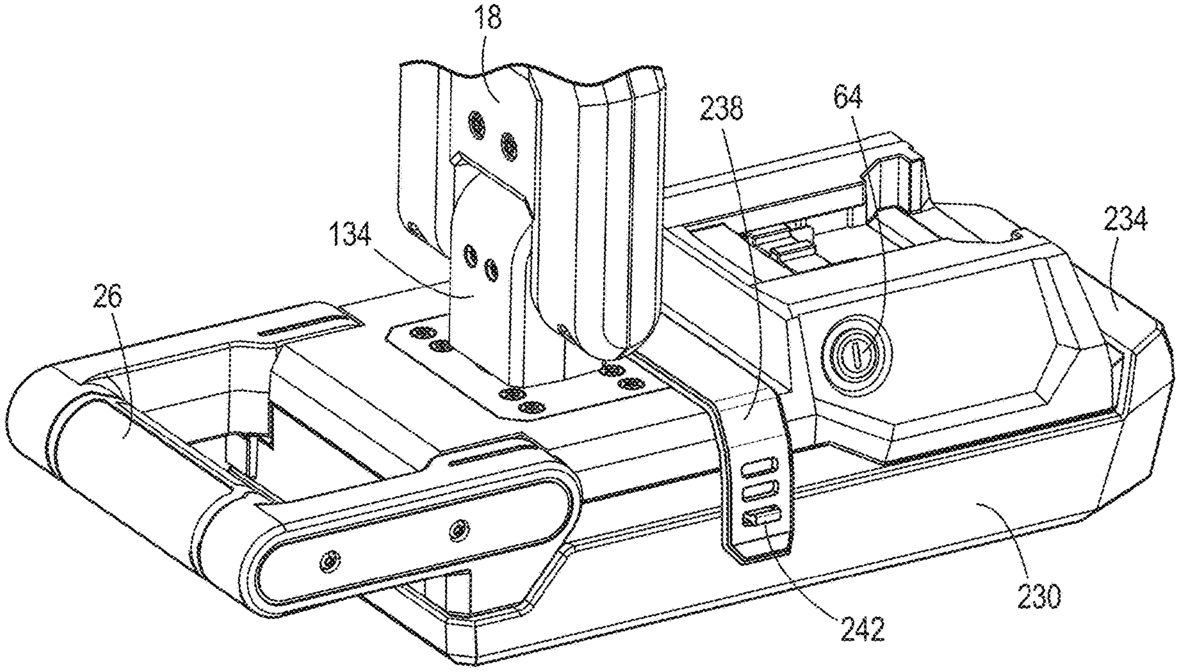
FIG. 8 is a perspective view of the boot of FIG. 7 attached to the base of the work light of FIG. 1A.

FIGS. 7 and 8 illustrate another embodiment of a boot 230 for the boom light 10 of FIG. 1A. With reference to FIGS. 1A, 7, and 8, the boot 230 is shaped complementarily to the second portion 38*b* of the housing 38 of the base 14 such that when the boot 230 is coupled to the base 14, the boot 230 substantially encapsulates the magnetic surface 62 (FIG. 2). As such, the boot 230 includes a first end 230*a* that is configured to align with the first end 14*a* of the boot 14 and a second end 230*b* that is configured to align with the second end 14*b* of the boot 14. The boot 230 further includes a first side 230*c* that extends between the first end 230*a* and the second end 230*b* and second side 230*d* that extends between the first end 230*a* and the second end 230*b* opposite from the first side 230*c*. The illustrated boot 230 also includes a wall 230*e* extending between the first end 230*a* and the second end 230*b*. The wall 230*e* may also be referred to as a bottom wall. The wall 230*e* is generally planar and shaped and sized to cover the magnetic surface 62 of the base 14. In the illustrated embodiment, the wall 230*e* covers the entire magnetic surface 62. In other embodiments, the wall 230*e* may cover only a portion of the magnetic surface 62. The boot 230 is formed of substantially the same material as the boot 30 of FIG. 4. Therefore, the boot 230 may inhibit wear caused by, among other things, engagement between the magnetic surface 62 (FIG. 2) and the work surface 5, thereby increasing the lifespan of the base 14 of the boom light 10. The boot 230 may also help protect the work surface 5 from marring or scratches. Additionally, the boot 230 may adjust the strength of the magnetic connection between the magnetic surface 62 (FIG. 2) and the work surface 5 such that the boot 230 reduces the amount of force that is required to overcome the magnetic connection between the base 14 and the work surface 5 to remove the base 14 from the work surface 5.

The boot 230 includes a toe portion 234, a strap 238, and a clasp 242 for coupling the boot 230 to the base 14. The toe portion 234 is provided at the first end 230*a* of the boot 230 and is configured to wrap around the first end 14*a* of the base 14 when the boot 230 is coupled to the base 14. Stated another way, the toc portion 234 of the boot 230 substantially encapsulates the first end 14*a* of the base 14 when the boot 230 is coupled to the base 14. The strap 238 is positioned roughly in the middle of the boot 230 and includes a first end 238*a* positioned at the first side 230*c* of the boot 230 and a second end 238*b* opposite the first end 238*a*. The clasp 242 is positioned at the second side 230*d* of the boot 230. The strap 238 is adjustable between an open configuration and a closed configuration to allow the boot 230 to be selectively attached and removed from the base 14. Specifically, the strap 238 includes strap apertures 246*a*, 246*b*, 246*c* at the second end 238*b* of the strap 238 that are configured to selectively receive the clasp 242 to adjust the strap between the open configuration and the closed configuration. That is, when the clasp 242 is received in one of the strap apertures 246*a*-246*c*, the clasp 242 holds the strap 238 in the closed configuration. The clasp 242 may be received in any one of the apertures 246*a*-246*c* to adjust the tightness with which the strap 238 secures the boot 230 to the base 14. In other embodiments, the second end 238*b* of the strap 238 may be secured to the boot 230 by other mechanisms. For example, the strap 238 may be secured by hook and loop fasteners (e.g., Velcro®), snaps, buttons, a buckle, a ratchet-strap mechanism, and the like.

As shown in FIG. 8, when the boot 230 is coupled to the base 14 of the boom light 10, the strap 238 wraps around a portion of the base 14. In the illustrated embodiment, the strap 238 is positioned between the arm 18 and the battery receptacle 50 on the base 14. Such an arrangement helps protect the strap 14 and inhibits the strap 238 from shifting or sliding on the base 14. In other embodiments, the strap 14 may wrap around other portions of the base 14 or the boom light 10.

Figure 9A:
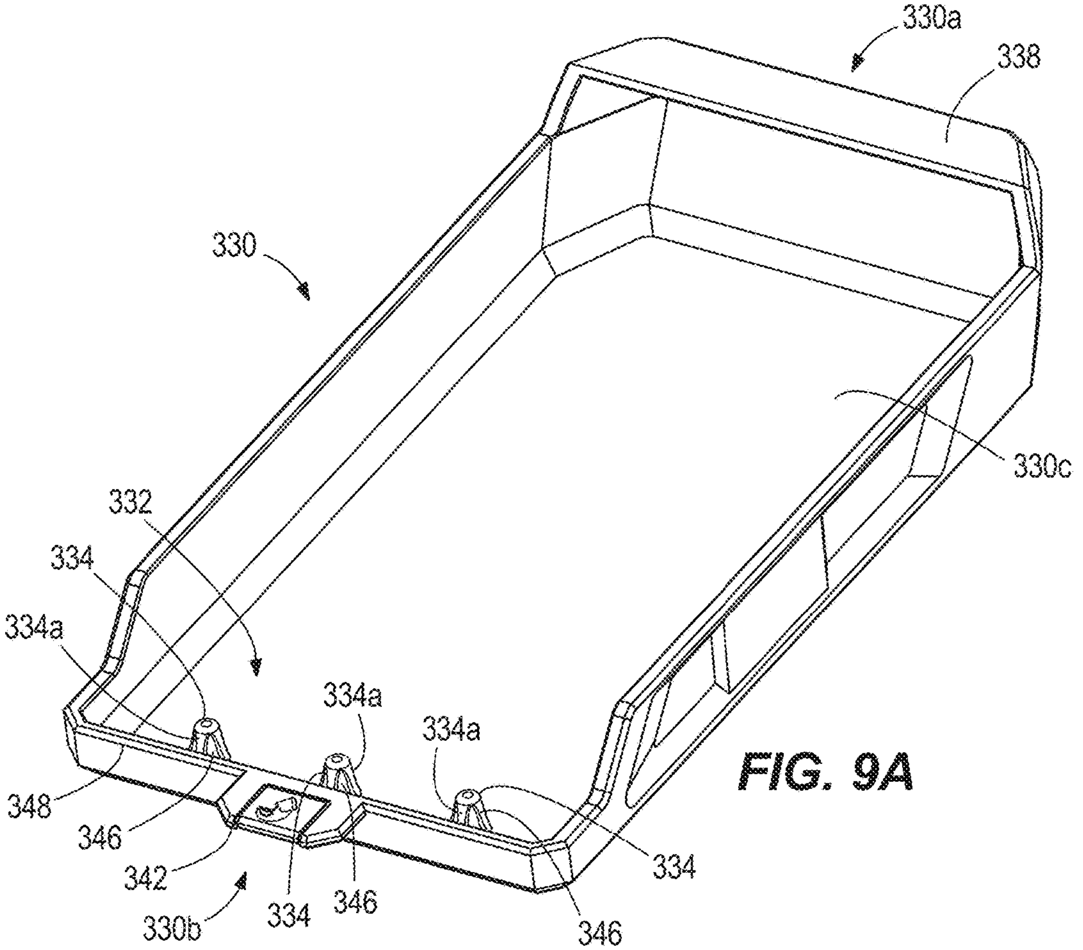
FIG. 9A is a perspective view of a boot according to another embodiment of the disclosure.
Figure 9B:
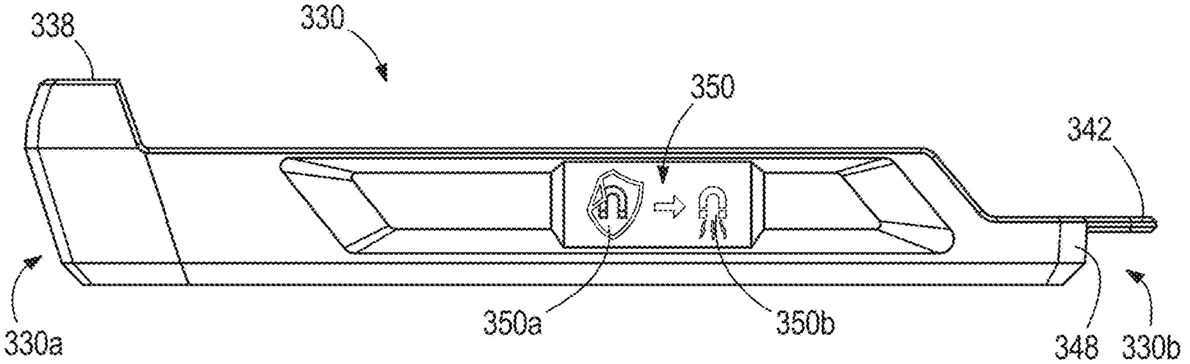
FIG. 9B is a side view of the boot of FIG. 9A.
Figure 10:
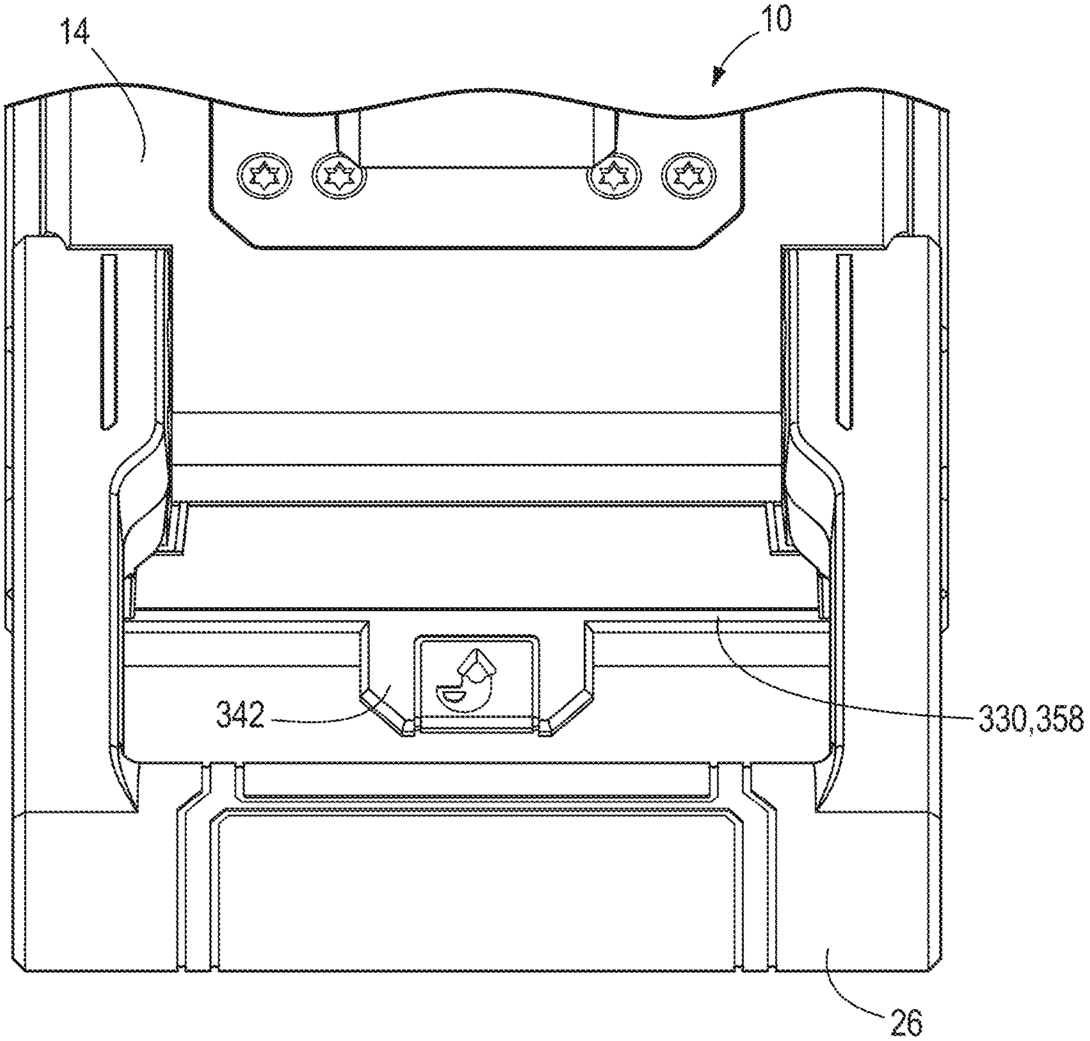
FIG. 10 is a rear view of the boot of FIG. 9A attached to the work light of FIG. 1A.

FIGS. 9A-10 illustrate another embodiment of a boot 330 for the boom light 10 of FIG. 1A. With reference to FIGS. 1, 9A, and 9B, the boot 330 is shaped complementarily to the second portion 38*b* of the housing 38 of the base 14 such that when the boot 330 is coupled to the base 14, the boot 330 substantially encapsulates the magnetic surface 62 (FIG. 2). As such, the boot 330 includes a first end 330*a* that is configured to align with the first end 14*a* of the boot 14 and a second end 330*b* that is configured to align with the second end 14*b* of the boot 14. The illustrated boot 330 also includes a wall 330*c* extending between the first end 330*a* and the second end 330*b*. The wall 330*c* may also be referred to as a bottom wall. The wall 330*c* is generally planar and shaped and sized to cover the magnetic surface 62 of the base 14. In the illustrated embodiment, the wall 330*c* covers the entire magnetic surface 62. In other embodiments, the wall 330*c* may cover only a portion of the magnetic surface 62. The boot 330 is formed of substantially the same material as the boot 30 of FIG. 4. Therefore, the boot 330 may inhibit wear caused by, among other things, engagement between the magnetic surface 62 (FIG. 2) and the work surface 5, thereby increasing the lifespan of the base 14 of the boom light 10. The boot 330 may also help protect the work surface 5 (FIG. 1A) from marring or scratches. Additionally, the boot 330 may adjust the strength of the magnetic connection between the magnetic surface 62 (FIG. 2) and the work surface 5 such that the boot 330 reduces the amount of force that is required to overcome the magnetic connection between the base 14 and the work surface 5 to remove the base 14 from the work surface 5.

The boot 330 includes a coupling interface 332 that is configured to engage the magnetic surface 62 of the base 14 (FIG. 2) to releasably attach the boot 330 to the base 14. Specifically, the coupling interface 332 includes a plurality of protrusions 334 and a toe portion 338 for coupling the boot 330 to the base 14. The boot 330 additionally includes a tab 342 to assist with removal of the boot 330 from the base 14. The protrusions 334 are substantially similar to the protrusions 86 of FIG. 4, and the toe portion 338 is substantially similar to the toe portion 234 of FIG. 7. As such, each protrusion 334 has a cylindrical body 334*a* that enables the protrusions 334 to be inserted into the circular apertures 54 of the second portion 38*b* of the housing 38 (FIG. 1A) to assist with coupling the boot 330 to the base 14. In the illustrated embodiment, the plurality of protrusions 334 includes three protrusions 334 disposed along the second end 334*b* of the boot 330 that are configured to be inserted into the three apertures 54 disposed along the first end 14*a* of the base 14. Each of the protrusions 334 includes a plurality of sweeps 346 equally spaced from each other around the cylindrical body 334*a* and extending outward from the cylindrical body 334*a* of the protrusion 334. In the illustrated embodiment, the sweeps 346 are compressible to create a friction fit between the protrusions 334 and the housing 38 of the base 14 (FIG. 1A), as similarly described with respected to the protrusions 86 and sweeps 90 of FIG. 4.

The toe portion 338 is provided at the first end 330*a* of the boot 330 and is configured to wrap around the first end 14*a* of the base 14 when the boot 330 is coupled to the base 14. Stated another way, the toe portion 338 of the boot 330 substantially encapsulates the first end 14*a* of the base 14 when the boot is coupled to the base 14. As such, the protrusions 334 and the boot 330 assist with coupling the boot 330 to the base 14 and inhibiting the boot 330 from being removed from the base 14. The tab 342 is provided at the second end 330*b* of the boot 330 and protrudes from a rear wall 348 of the boot 330. When the boot 330 is coupled to the base 14, as illustrated in FIG. 10, the tab 342 is positioned adjacent to the handle 26. As such, the tab 342 is configured to be grasped to assist with removal of the boot 330 from the base 14. For example, a user may grasp the handle 26 with one hand and the tab 342 with the other hand and pull the handle 26 and the tab 342 in opposite directions to remove the boot 330 from the base 14.

As illustrated in FIG. 9B, the boot 330 further includes indicia 350 on a side of the boot 330. The indicia 350 designate a magnetic status of the base 14. Specifically, a first indicium 350*a* includes a shield and an inactive magnet to designate that the boot 330 substantially inhibits or reduces magnetic engagement for the base 14 while the boot 330 is coupled to the base 14. A second indicium 350*b* includes an active magnet and no shield to designate that the base 14 is able to magnetically engage other objects with the boot 330 removed from the base 14.

Although the invention has been described in detail with reference to certain preferred embodiments, variations and modifications exist within the scope and spirit of one or more independent aspects of the invention as described.

The invention claimed is:

1. A work light comprising:

a base including a bottom surface;

a light fixture supported by the base;

a magnet adjacent the bottom surface, the magnet configured to create a magnetic connection between the bottom surface of the base and a work surface to selectively secure the base to the work surface; and a boot coupled to the base and extending over the bottom surface, the boot configured to reduce a strength of the magnetic connection between the base and the work surface wherein the base includes an aperture, and wherein the boot includes a protrusion that is configured to be inserted into the aperture to couple the boot to the base.

2. The work light of claim 1, wherein the boot inhibits the base from being magnetically secured to the work surface.

3. The work light of claim 1, wherein the base is securable to the work surface via the magnetic connection while the boot is attached to the base.

4. The work light of claim 1, wherein the magnet is exposed on a surface of the base, and wherein the boot covers the magnet.

5. The work light of claim 1, wherein the boot is formed of a rubber material.

6. The work light of claim 1, wherein the aperture is one of a plurality of apertures in the base, wherein the protrusion is one of a plurality of protrusions on the boot, and wherein each protrusion of the plurality of protrusions is insertable into a corresponding aperture of the plurality of apertures to couple the boot to the base.

7. The work light of claim 1, wherein the protrusion includes a plurality of sweeps, and wherein the base compresses the plurality of sweeps when the protrusion is inserted into the aperture.

8. The work light of claim 1, wherein the boot includes a toe portion that is configured to wrap around an end of the base.

9. The work light of claim 1, wherein the boot includes a tab that is graspable to assist with removal of the boot from the base.

10. A work light comprising:

a base;

a light fixture supported by the base;

a magnet coupled to the base and exposed on a surface of the base, the magnet configured to create a magnetic connection between the base and a work surface to secure the base to the work surface; and a boot releasably attached to the base and covering the magnet;

wherein the surface of the base includes an aperture, and wherein the boot includes a protrusion that is configured to be inserted into the aperture to couple the boot to the base.

11. The work light of claim 10, wherein the protrusion includes a plurality of sweeps, and wherein the base compresses the plurality of sweeps when the protrusion is inserted into the aperture.

12. The work light of claim 10, wherein the boot includes a toe portion that is configured to wrap around an end of the base.

13. A boot for use with a work light, the work light including a base, a light fixture supported by the base, and a magnet coupled to the base, the magnet configured to create a magnetic connection between the base and a work surface to selectively secure the base to the work surface, the boot comprising:

a first end configured to align with a first end of the base;

a second end configured to align with a second end of the base; and a wall extending between the first end and the second end, the wall configured to reduce a strength of the magnetic connection between the base and the work surface;

wherein the first end of the boot includes a toe portion that is configured to wrap around the first end of the base.

14. The boot of claim 13, wherein the boot is formed of a rubber material.

15. The boot of claim 13, wherein the second end of the boot includes a tab that is graspable to assist with removal of the boot from the base.

* * * * *